Patented Nov. 16, 1937

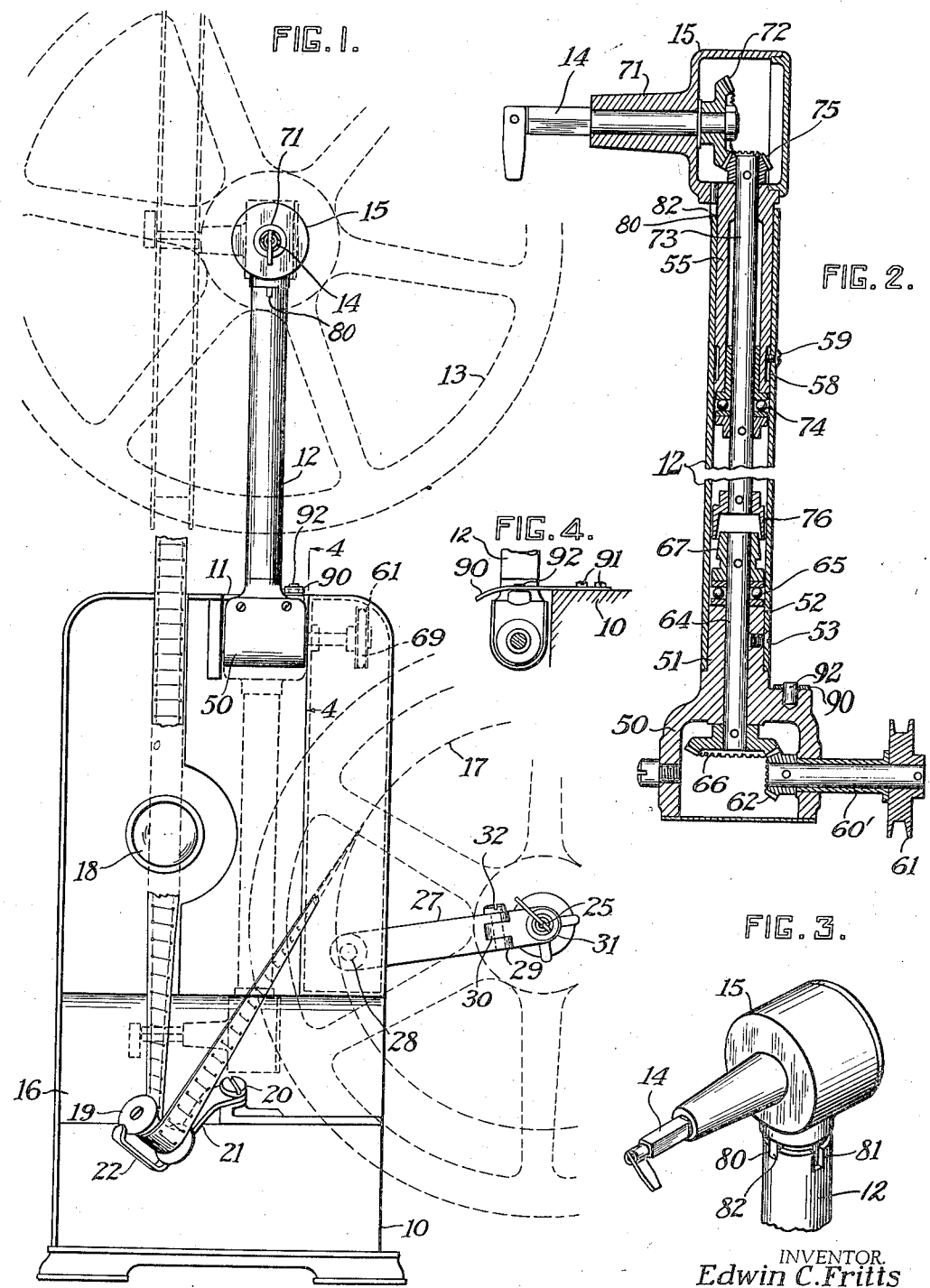

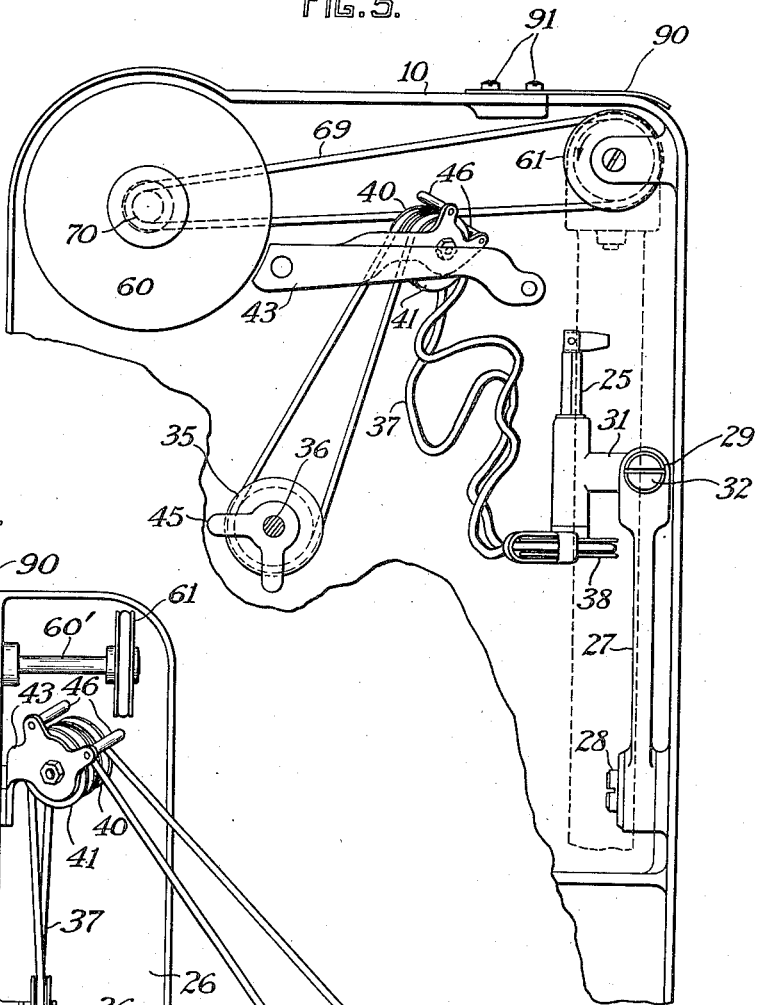
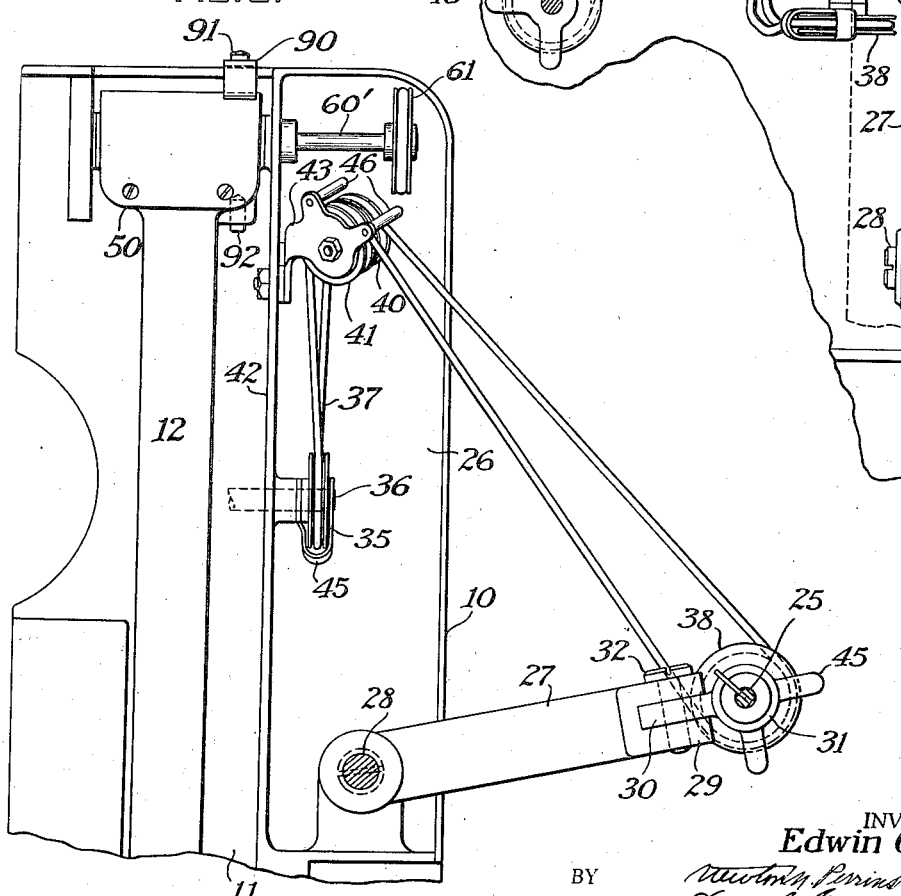

2,099,299

UNITED STATES PATENT OFFICE 2,099,299

REEL MOUNTING FOR MOTION PICTURE PROJECTION APPARATUS

Edwin C. Fritts, Rochester, N. Y., assignor, by mesne assignments, to Eastman Kodak Company, Jersey City, N. J., a corporation of New Jersey Application April 14, 1936, Serial No. 74,330

11 Claims. (Cl. 242—55)

This invention relates to photography particularly to the mounting for the supply reel on a motion picture projector.

One object of my invention is to mount the supply reel on a projector so that it can be swung between two positions relative to the operating position of the takeup reel, namely, at right angles thereto for projection purposes and in alignment therewith for rewind purposes. Another object of my invention is to provide a separate driving means for driving the supply reel for rewind purposes only. And still another object is to provide a suitable driving means for the supply spindle so that it will be automatically engaged and disengaged with said rewind drive when the reel thereon is swung to and from its rewind position relative to said takeup reel. And yet another object is to provide a motion picture projector in which the support for the takeup reel, and the supply reel, along with other necessary film guiding means, are adapted to fold toward the projector housing for carrying purposes.

Briefly, my invention consists of a projection apparatus wherein the takeup reel is mounted on the projector housing to one side of the projected light beam and at right angles thereto for its operating position. The supply reel is rotatably mounted on the top of the projector housing to swing from a projecting position, wherein it is directly above and in line with the film feeding mechanism but at right angles with the takeup reel, to a rewind position wherein it is in alignment with said takeup reel and the film is rewound directly from reel to reel outside of the projector. A separate motor and drive shaft is provided in the housing for rewind purposes. The mounting for the supply reel comprises a tube member through which the driving connection for the supply spindle extends. The mounting for the supply spindle comprises a housing having a sleeve fit with said tube member so that it is rotatably and slidably mounted with respect thereto. As the supply spindle is swung between its rewind and projecting positions it is cammed longitudinally of the tube member and the drive connection between it and the rewind drive shaft, which includes a friction cone clutch, is automatically made and broken respectively.

The novel features that I consider characteristic of my invention are set forth with particularity in the appended claims. The invention itself, however, both as to its organization and its methods of operation, together with additional objects and advantages thereof, will best be understood from the following description of specific embodiments when read in connection with the accompanying drawings in which, Figure 1 is a front elevation of a projection apparatus embodying the preferred form of my invention, Figure 2 is an enlarged section through the support for supply reel and the housing enclosing the rewind drive mechanism to clearly show the driving connection between the rewind motor and the supply spindle, Figure 3 is a perspective of the rotatable supply spindle head showing the locking and position means therefor, Figure 4 is a side elevation of the locking means for releasably holding the support for the supply reel in operating position atop the projector housing taken on line 4—4 of Figure 1, Figure 5 is an enlarged partial side view of the projector with certain parts removed to show the takeup reel support folded into its carrying position, and the rewind motor and its associated drive, and, Figure 6 is an enlarged partial front view of the projector with certain parts removed to show the takeup reel support in operating position.

Like reference characters refer to corresponding parts in the several figures.

Referring now to Figure 1, wherein a preferred form of my invention is illustrated, 10 represents the main frame or housing of the projector, preferably of closed form as shown, and in which is arranged the film feeding, light controlling, and other kindred mechanisms usual to a projection apparatus.

In a recess 11 of the housing 10, support 12 for the supply reel 13 is rotatably mounted so that it can be folded down against the projector housing, as shown by the dotted position thereof in Figure 1, the supply spindle 14 and its associated gear housing or turning post 15 being received in the recess 16 of the projector housing 10.

The supply spindle 14 is suitably mounted on top of the support 12, as will be described fully hereinafter, so that it can be swung from a projecting position, to a rewind position, as shown in Fig. 1 wherein it is in alignment with the takeup reel 17 so that the rewinding of the film can take place directly from reel to reel externally of the projector. When the supply reel is in its projecting position it is in alignment with the usual film feeding mechanism, not shown, and the objective 18, so that the film can be pulled directly therefrom by said film feeding mechanism.

In its takeup position, the takeup reel 17 is mounted to one side of and at right angles to the objective 18 and the film path of the projector so that the film on leaving said film feeding mechanism has to be turned through 90 degrees to be guided onto said takeup reel. In order to negotiate this 90 degree turn in the film path, I provide a guide roller 19 which is movably mounted on the housing 10 by screws 20 and bracket 21, said bracket being formed as at 22 to enclose one side of the roller to prevent the film from running off thereof. When the guide roller 19 is not in use it can be swung about its point of fastening and be received compactly in the recess 16 of the housing 10 along with the supply spindle 14.

As shown most clearly in Figures 5 and 6, the takeup spindle 25 is so mounted on the projector housing 10 that it is adapted to be folded and swung into a recess 26 in the housing 10 for carrying purposes. The mounting for the takeup reel comprises an arm 27 which is rotatably pinned at one end to the housing 10 by the bolt 28. The other end of the arm 27 provides a yoke member 29 into which a lug 30 on the takeup spindle casing 31 projects and is rotatably confined by a tie bolt 32 passing through the two. Therefore, by virtue of this described mounting, the takeup spindle 25 is adapted to be folded into the carrying position shown in Figure 5.

To drive the takeup spindle, a pulley 35 is fastened to the drive shaft 36, which is capable of being driven in any suitable manner from the main source of power not shown, and a continuous belt 37 is run therefrom over another pulley 38 pinned to one end of the take-up spindle. Due to the relative position of the driving pulley 35, and the pulley 38 on the takeup spindle when said spindle is in its takeup position, and in order to allow the takeup reel to float with respect to its pivot point 28 so that the weight of the film on the reel can control the friction in the driving belt during takeup, I mount a pair of guide pulleys 40 and 41 on a partition 42 of the housing 10, said pulley being angularly mounted on a bracket 43 as shown so that they serve to properly change the direction of the driving belt 37 so that it will effect a proper power transmission to the takeup spindle 25 from the main source of power, and also suspend said takeup spindle so that the belt friction will be controlled by the change in weight of the takeup reel. Bracket 43 on which the guide pulleys 40 and 41 are mounted is itself adjustably mounted on the partition 42 so that the tension in the belt 37 can be regulated by adjustment thereof. In order to keep the driving belt 37 on the several pulleys when the reel arms are folding to their carrying positions, see Figure 5, the pulleys 35 and 38 are provided with guides 45, while a pair of pins 46 fixed to the bracket 43 are adapted to extend across the periphery of the pulleys 40 and 41 so that in each case the belt must be threaded on to or off of the pulley.

Referring now to Figures 1 and 2, the support for the supply spindle 14 consists of a gear housing 50 which is rotatably mounted in the recess 11 in the projector housing 10 so that the supply spindle 14 can be rotated to the carrying position indicated in Figure 1. The gear housing 50 is provided with a sleeve portion 51 over which the tube member 52 is adapted to slide and be held in place by a screw 53. Gear housing 15, which will be hereinafter referred to as a turning post, is provided with a sleeve portion 55 which is adapted to have a sliding connection with the tube member 52 so that when said gear housing 15 or turning post is mounted on top of the tube member it will be capable of rotation and sliding movement axially thereof. In order to limit the movement of the turning post 15 axially of the tube member 52, the sleeve 55 thereof is provided with a slot 58 into which a screw 59, extending through the tube member, extends.

For rewind purposes, a separate rewind motor 60, see Figure 5, is mounted in the top of the projector housing 10 for the sole purpose of driving the supply spindle 14 to effect a rewind of the film. The driving connection between the supply spindle 14 and the rewind motor consists of a shaft 60' which extends into the gear housing 50 and has a pulley 61 fixed to one end thereof and a bevel gear 62 fixed to the end extending into the gear housing. A shaft 64 is positioned in the sleeve 51 of the gear housing 50 by means of a thrust bearing 65, and on one end of said shaft is pinned a bevel gear 66 which is in turn in engagement with the bevel gear 62, while on the other end of said shaft 64 there is pinned a male member 67 of a friction cone clutch. A belt 69 passing over a pulley 70 on the motor 60 and the pulley 61 drives the male member 67 of the friction cone clutch whenever said rewind motor is switched on by the operator.

The turning post 15 is provided with a bearing portion 71 through which the supply spindle 14 is adapted to extend and be supported thereby, and a bevel gear 72 is fixed to the end of said supply spindle. Another shaft 73 is adapted to extend through the sleeve 55 of the turning post 15 and into the tube member 52, and is properly positioned therein by means of the thrust bearing 74 and the bevel gear 75, said bevel gear 75 being pinned to one end of the shaft and being in engagement with the bevel gear 72 on the supply spindle. A female member 76 of a cone clutch is pinned to the end of the shaft 73 extending into the tube 52, and is adapted to frictionally engage the male member 67 and thereby complete a driving connection between the rewind motor 60 and the supply spindle 14.

Referring now to Figure 3, the upper end of the tube member 52 is provided with two elongated slots 80 and 81 of different lengths, and these slots are placed 90 degrees apart from one another on the periphery of the tube 52 so that when the turning post 15 is rotated to position the lug 82 thereon in one slot or the other, the supply spindle 14 is properly positioned and locked in either its projecting or rewind position. In Figures 2 and 3 the turning post 15 is shown in its projecting position and the drive shaft 73, which is movable with the post, is elevated axially of the tube 52 so that the cone clutch members 76 and 67 are out of engagement and the supply spindle is disengaged from the major part of the transmission between itself and the rewind motor to relieve tension on the film during projection. This automatic disengagement of the supply spindle also removes the danger of accidentally throwing said supply spindle into rewind operation while it is in projecting position, said occurrence being probable through the accidental operation of the switch controlling the rewind motor.

When projection is finished, and it is desired to rewind the film, the turning post 15 is lifted to disengage the lug 82 from the slot 80 to the tube 52, and is then rotated until said lug drops into slot 81. The supply reel on the spindle 14 is then in alignment with the takeup reel 17 and the film is threaded directly from one to the other externally of the projector. The slot 81 is longer than the slot 80 so that when the lug 82 on the turning post 15 is positioned therein, the shaft 73 is allowed to be dropped axially of the tube 52 a sufficient distance to allow the female member 76 to properly engage the male member 67 and the transmission between the rewind motor 60 and the supply spindle 14 is complete.

This particular transmission between the rewind motor 60 and the supply spindle 14 is exceedingly compact, almost entirely enclosed in the spindle support, and is so inter-connected that the supply spindle support can be rotated to the folded carrying position, see dotted position of supply spindle support in Figure 1, without requiring the manual disengagement of it and said transmission.

In order to positively hold and position the supply spindle support 12 in its operating position, a pin 92 fixed in but extending from the gear housing 50 is adapted to snap into engagement with an apertured spring member 90, said spring member being fastened to the projector housing 10 by means of screws 91, see Figure 4. The end of the spring member 90 is adapted to extend a sufficient distance beyond the edge of the gear housing 50 in order to be easily accessible for gripping it with the fingers to effect a release thereof.

It will be understood from the above description of the preferred form of my invention that a projection apparatus is provided wherein the reel arm and film guiding mechanism are all adapted to fold within the overall dimension of the projector housing for their inoperative position so that the whole apparatus could be enclosed by a symmetrical casing if desired. The particular driving connection between the individual rewind motor and the supply spindle provides an automatic means of connecting and disconnecting the supply spindle with the rewind motor when said spindle is rotated between its projecting and rewind positions relative to said takeup reel.

Although I have shown and described certain specific embodiments of my invention, I am fully aware that many modifications thereof are possible. My invention, therefore, is not to be restricted except in so far as necessitated by the prior art and by the spirit of the appended claims.

Having thus described my invention what I declare as new and desire to secure by Letters Patent is:

1. In a motion picture projector the combination of a housing, a takeup reel on one side of said housing, a supply reel, means for movably mounting said supply reel to swing from a projecting position wherein it is at right angles to said takeup reel to a rewind position wherein it is in alignment with said takeup reel, said means comprising an elongated tube member, a turning post rotatably mounted on top of said tube member, and a spindle for said supply reel fixed to said turning post to move therewith, a power shaft for rewinding purposes including a driving connection extending into one end of said elongated tube, and a drive shaft movable with said turning post, one end of said shaft being connected with the spindle while the other end extends into said elongated tube, and a driving connection on the end of said drive shaft adapted to engage said driving connection on the power shaft when said turning post is revolved to position the supply reel in alignment with the takeup reel for rewind purposes.

2. In a motion picture projector the combination of a housing, a takeup reel mounted on one side of said housing, a supply reel, means for movably mounting said supply reel to swing from a projecting position to a rewind position relative to said takeup reel, said means comprising an elongated tube member, a turning post rotatably and slidably mounted in one end of said tube member, a spindle for the supply reel fixed to and movable with said turning post, and cooperating means between said turning post and said tube member adapted to slide said turning post axially of said tube member as it is rotated, a power shaft for rewind purposes, and suitable driving means connected to said spindle and movable with said turning post whereby said spindle is operably connected to and disconnected from said power shaft as it is swung between its projecting and rewinding positions relative to said takeup reel.

3. In a motion picture projector the combination of a housing, a takeup reel mounted on one side of said housing, a tube member fixed to said housing, a turning post rotatably and slidably mounted in one end of said tube member, a geared spindle supported by and movable with said turning post, a supply reel mounted on said spindle and adapted to be moved from a projecting to a rewinding position relative to said takeup reel as said turning post is moved, a power shaft for rewinding purposes extending into the other end of said tube member, a shaft in said tube member geared to said spindle and movable with said turning post, and adapted to engage said power shaft when the spindle is in its rewind position, and cooperating means between said turning post and said tube member adapted to disengage said shaft from said power shaft when the spindle is rotated to its projecting position.

4. In a motion picture projector the combination of a housing, a takeup reel mounted on said housing, a supply reel, means for movably mounting said supply reel on said housing to swing from a projecting to a rewinding position relative to said takeup reel, said means including a tube member, a supply spindle, a support for said spindle rotatably and slidably mounted in one end of said tube member, a power shaft for rewinding purposes extending into the other end of said tube member, and a drive shaft geared to said supply spindle and movable with the support therefor, said drive shaft adapted to alternately engage and disengage said power shaft as the spindle is rotated between its rewinding and projecting positions respectively.

5. In a moving picture projector the combination of a housing, a takeup spindle foldably mounted on one side of said housing and adapted to swing from an operating to a carrying position, a takeup reel mounted thereon, suitable means for driving said takeup spindle, a supply reel, means for mounting said supply reel on said housing so that it is adapted to move between the projecting and rewinding positions relative to said operating position of said takeup reel, said means comprising a tube member, a turning post rotatably and slidably mounted in one end of said tube member, a supply spindle journaled in and movable with said turning post, a drive shaft movable with said turning post, one end of said shaft being connected with the supply spindle while the other end extends into said tube member, a gear housing fixed to the other end of said tube member and adapted to be rotatably mounted on said housing, driving means for rewind purposes extending into said gear housing and into said tube member to be engaged by said drive shaft, and cooperating means on the projector housing and said gear housing for releasably holding said supply spindle support in erected operating position.

6. In a motion picture projector the combination of a housing, a takeup spindle foldably mounted on one side of said housing and adapted to swing from an operating to a carrying position, a takeup reel mounted thereon, suitable means for driving said takeup spindle, a supply reel, means for mounting said supply reel so that it is adapted to move between projecting and rewind positions relative to operating position of said takeup reel, said means comprising a tube member, a turning post rotatably and slidably mounted in one end of said tube member, a supply spindle journaled in and movable with said turning post, a drive shaft movable with said turning post, one end of said drive shaft being connected with the supply spindle while the other end extends into said tube member, a gear housing fixed to the other end of said tube member and adapted to be rotatably mounted on said housing, driving means for rewind purposes extending into said gear housing and into said tube member to be engaged by said drive shaft, and cooperating means on the projector housing and said gear housing for releasably holding said supply spindle support in erected operating position, said means including a pin fixed to and extending from said gear housing, and an apertured spring member fixed to said projector housing for engaging said pin.

7. In a moving picture projector the combination of a housing, a takeup spindle foldably mounted on one side of said housing and adapted to swing from an operating to a carrying position, a takeup reel mounted thereon, suitable means for driving said takeup spindle, a supply reel, means for mounting said supply reel so that it is adapted to move between projecting and rewinding positions relative to the operating position of said takeup reel, said means comprising a tube member, a turning post rotatably and slidably mounted in one end of said tube member, a supply spindle journaled in and movable with said turning post, a drive shaft movable with said turning post, one end of said shaft being connected with the spindle while the other end extends into said tube member, a gear housing fixed to the other end of said tube member and adapted to be rotatably mounted on said housing, and driving means for rewind purposes extending into said gear housing and into said tube member to be engaged by said drive shaft.

8. In a moving picture projector the combination of a housing, a takeup spindle foldably mounted on the side of said housing, a takeup reel thereon, a supply reel, suitable means for mounting said supply reel so that it is adapted to move between the projecting and rewinding positions relative to said takeup reel, said means comprising a tube member having a pair of elongated slots cut in one end thereof and definitely displaced from one another about the periphery thereof, a turning post rotatably and slidably mounted in one end of said tube member, a driven spindle for the supply reel movable with said turning post, a lug on said turning post adapted to engage the slot in said tube member to locate the supply spindle in either the rewind or projecting position, a power shaft for rewinding purposes extending into the other end of said tube member, and a drive shaft movable with said turning post and having one end connected with said supply spindle, the other end of said drive shaft adapted to extend into said tube member to alternately engage and disengage said power shaft when the supply spindle is swung to and from its projecting and rewinding positions respectively.

9. In a motion picture projector the combination of a housing, a takeup reel mounted on one side thereof, a supply reel, suitable means for mounting said supply reel to swing from a projecting position to a rewinding position relative to said takeup reel, said means including a tube member, a turning post rotatably and slidably mounted in one end of said tube member to move between two positions, a spindle for said supply reel journalled in and movable with said turning post, cooperating means between said tube member and said turning post to effect a translation of said turning post longitudinally of said tube member when it is rotated thereon, a power shaft for rewinding purposes, and driving means connected to said spindle and movable with said turning post whereby a driving connection between said power shaft and said supply spindle is alternately made and broken as the supply reel is swung to and from its projecting and rewind positions respectively relative to said takeup reel.

10. In a moving picture apparatus the combination with a housing, a takeup spindle mounted on the side of said housing and adapted to fold against the side thereof for its carrying position, means for driving said takeup spindle, a takeup reel mounted thereon, of a supply spindle, a suitable means for mounting said supply spindle atop said housing whereby it can be folded against the housing for its carrying position and move between projecting and rewinding positions relative to said takeup reel in its operating position, said means comprising a tube member having a pair of elongated slots cut in the end thereof and definitely displaced from one another about the periphery thereof, a turning post rotatably and slidably mounted in one end of said tube member, a driven spindle for the supply reel movable with said turning post, a lug on said turning post adapted to engage the slots in said tube member to locate the supply spindle in either the rewind or projecting positions, a power shaft for rewinding purposes extending into the other end of the tube member and a drive shaft movable with said turning post, one end of said drive shaft being in driving engagement with the supply spindle while the other end is adapted to engage and disengage the power shaft as the turning post is moved.

11. In a motion picture projector the combination of a housing, a takeup reel on one side of said housing, a supply reel, means for movably mounting said supply reel on the housing to move from a projecting position to a rewind position relative to said takeup reel, said means comprising an elongated tube, a turning post rotatably and slidably mounted in one end of said tube, a spindle for the supply reel fixed to the turning post to move therewith, a power shaft for rewinding purposes including a driving connection extending into one end of the tube, a male clutch member on the end of said power shaft in the tube, a drive shaft movable with said turning post, one end of said drive shaft being connected with the spindle while the other end extends into said tube, and a female clutch member on the end of said drive shaft adapted to engage said male clutch member on the power shaft when the turning post is moved to position the supply reel in rewinding position.

EDWIN C. FRITTS.